(12) United States Patent
Fu et al.

(10) Patent No.: US 9,361,702 B2
(45) Date of Patent: Jun. 7, 2016

(54) IMAGE DETECTION METHOD AND DEVICE

(75) Inventors: Qiang Fu, Shenzhen (CN); Bo Li, Shenzhen (CN); Zhenwei Zhang, Shenzhen (CN); Qimei Chen, Shenzhen (CN); Jun He, Shenzhen (CN); Dengbiao Jiang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 178 days.

(21) Appl. No.: 14/127,555

(22) PCT Filed: Jun. 27, 2012

(86) PCT No.: PCT/CN2012/077580
§ 371 (c)(1),
(2), (4) Date: Dec. 19, 2013

(87) PCT Pub. No.: WO2013/000404
PCT Pub. Date: Jan. 3, 2013

(65) Prior Publication Data
US 2014/0169639 A1    Jun. 19, 2014

(30) Foreign Application Priority Data

Jun. 28, 2011   (CN) .......................... 2011 1 0176980

(51) Int. Cl.
*G06T 7/20*    (2006.01)
(52) U.S. Cl.
CPC ................ *G06T 7/20* (2013.01); *G06T 7/2006* (2013.01); *G06T 2207/10016* (2013.01); *G06T 2207/30196* (2013.01); *G06T 2207/30232* (2013.01); *G06T 2207/30241* (2013.01)

(58) Field of Classification Search
None
See application file for complete search history.

(56) References Cited

U.S. PATENT DOCUMENTS

2007/0112699 A1    5/2007   Zhao et al.

FOREIGN PATENT DOCUMENTS

CN    101777180 A    7/2010

OTHER PUBLICATIONS

Xue, Gengjian, Jun Sun, and Li Song. "Dynamic background subtraction based on spatial extended center-symmetric local binary pattern." Multimedia and Expo (ICME), 2010 IEEE International Conference on. IEEE, 2010.*
Yao, Jian, and Jean-Marc Odobez. "Multi-layer background subtraction based on color and texture." Computer Vision and Pattern Recognition, 2007. CVPR'07. IEEE Conference on. IEEE, 2007.*

(Continued)

*Primary Examiner* — Vikkram Bali
*Assistant Examiner* — Tracy Mangialaschi
(74) *Attorney, Agent, or Firm* — Ling Wu; Stephen Yang; Ling and Yang Intellectual Property

(57) ABSTRACT

A method and device for detecting images are used to improve a detection rate and accuracy rate of the image moving target detection, so that moving targets also can be accurately detected in a scenario with complicated illumination changes. The method for detecting the images includes: collecting an image, performing moving target detection on the image by using a preset mixed space-time background model, and determining a target image; wherein, the mixed space-time background model is obtained in advance by modeling according to a grayscale change trend of the image.

6 Claims, 5 Drawing Sheets

(56) References Cited

OTHER PUBLICATIONS

International Search Report for PCT/CN2012/077580 dated Aug. 17, 2012.

Qiang Zhenping et al.; "Multi-layer subtraction algorithm for moving object detection based on color and texture background model", Journal of Computer Application, Jun. 2009, vol. 29, pp. 227-230.

\* cited by examiner

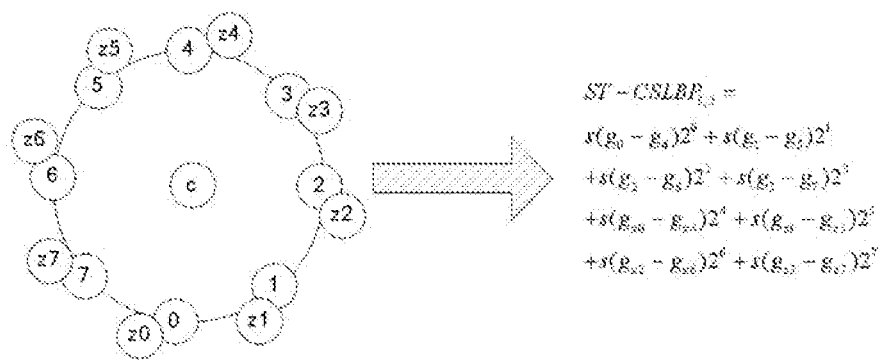
FIG. 3
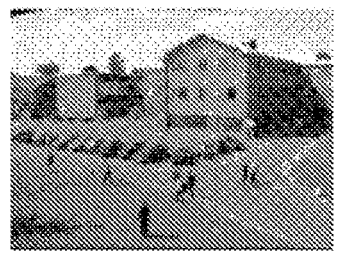
FIG. 4-a
FIG. 4-b

FIG. 4-c
FIG. 4-d
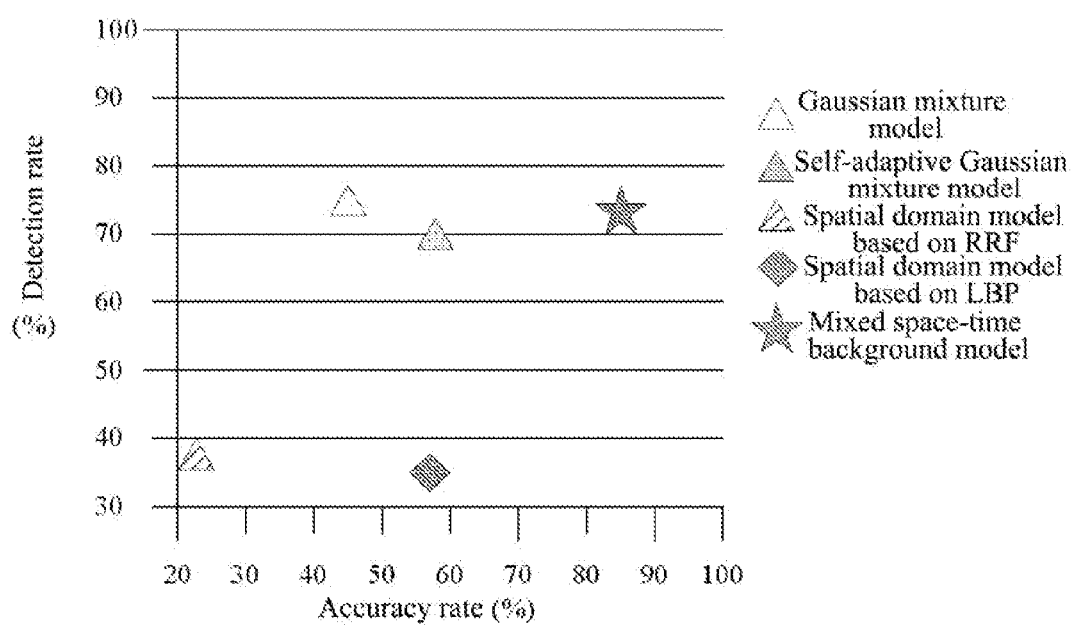
FIG. 5

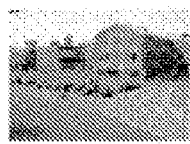
FIG. 6-a
FIG. 6-b
FIG. 6-c
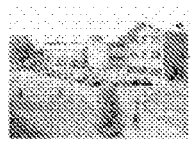
FIG. 6-d
FIG. 6-e

FIG. 6-f
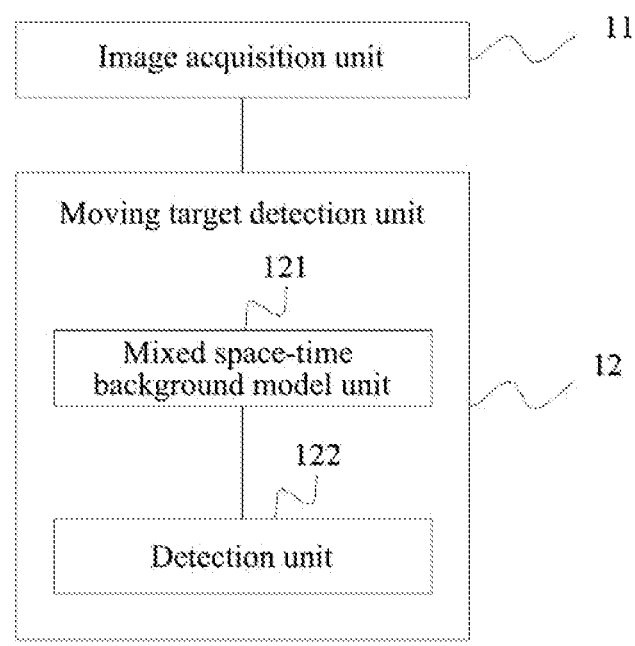
FIG. 7

IMAGE DETECTION METHOD AND DEVICE

TECHNICAL FIELD

The present document relates to the field of image processing technology, and particularly, to a method and device for detecting images.

BACKGROUND OF THE RELATED ART

Image moving target detection is an important research direction of the intelligent video surveillance field, and background modeling as a method most widely used in the motion detection is a critical part in the computer vision, and effective segmentation between background and prospect has significant influence on the following high layer processing such as target tracking, object identification and behavioral classification and so on. However, the background modeling method is comparatively sensitive to scene illumination changes, including long-term regular changes such as leaves trembling and day-night alternation and short-term random changes such as weather and moving objects and so on.

At present, the study of background modeling is mainly carried out from two aspects, i.e., pixel time domain statistics and spatial domain texture analysis, the method based on of pixel time domain distribution statistics, such as a Gaussian Mixture Model and an improved method thereof, can better adapt to the long-term regular illumination changes, however, since the model assumes that all pixels in a time series observed are mutually independent and very sensitive to subtle illumination or short-term illumination changes, the detection effect is not ideal enough. Based on the spatial domain background model such as a Local Binary Pattern (LBP), a Radial Reach filter has a good robustness under the short-term illumination changes since unchanged spatial domain textural features within local areas are used, however, if only part of pixels are changed within the local areas, the extracted features cannot satisfy the spatial domain invariance at this point, the detection effect will be affected greatly, and this situation tends to be more common in outdoor videos.

Compared with the LBP, a Center Symmetric-Local Binary Pattern (CSLBP) texture model in the related art has a lower feature dimension and a stronger anti-noise ability and is easy for real-time operations when applied in the background modeling. However, the CSLBP is confined to considering the robustness to the short-term illumination changes and fails to consider that time domain distribution characteristics of textures have significant influence on the background modeling, and when the long-term illumination changes cause that part of pixels within the local areas are changed, the CSLBP cannot satisfy the spatial domain invariance, thus in a scenario with complicated illumination changes, especially when short-term illumination changes and long-term illumination changes coexist, the CSLBP cannot satisfy needs of the background modeling.

SUMMARY OF THE INVENTION

The embodiment of the present document provides a method and device for detecting images, which can improve a detection rate and accuracy rate of image moving target detection, so that moving targets also can be accurately detected in a scenario with complicated illumination changes.

A method for detecting images provided by an embodiment of the present document comprises:
  modeling to obtain a mixed space-time background model according to a grayscale change trend of an image; and
  collecting the image, performing moving target detection on the image by using the mixed space-time background model, and determining a target image.

A device for detecting images provided by an embodiment of the present document comprises:
  an image acquisition unit, configured to: acquire an image; and
  a moving target detection unit, configured to: perform moving target detection on the image by using a preset mixed space-time background model, and determine a target image; wherein, the mixed space-time background model is obtained in advance by modeling according to a grayscale change trend of the image.

In the embodiment of the present document, the mixed space-time background model is obtained by modeling according to the grayscale change trend of the image; the image is collected, the moving target detection is performed on the image by using the mixed space-time background model, and the target image is determined, thus the detection rate and accuracy rate of the image moving target detection are improved, so that moving targets in the image also can be accurately detected in a scenario with complicated illumination changes.

BRIEF DESCRIPTION OF DRAWINGS

FIG. 3 is a descriptive diagram of an ST-CSLBP operator provided by the embodiment of the present document.

FIG. 4-$a$ is an input image of the current frame, FIG. 4-$b$ is a detection result of a Gaussian mixture model based on color, FIG. 4-$c$ is a detection result based on a space model, and FIG. 4-$d$ is a detection result obtained through the mixed space-time background modeling method provided by the embodiment of the present document.

FIG. 5 is a schematic diagram of comparison between the mixed space-time background modeling method provided by the embodiment of the present document and other methods with respect to the detection rate and accuracy rate.

FIG. 6-$a$ to FIG. 6-$f$ are schematic diagrams of test results provided by the embodiments of the present document.

FIG. 7 is a schematic diagram of a structure of a device for detecting images provided by the embodiment of the present document.

PREFERRED EMBODIMENTS OF THE INVENTION

The embodiment of the present document provides a method and device for detecting images, which is used to improve the detection rate and accuracy rate of the image moving target detection, so that moving targets also can be accurately detected in a scenario with complicated illumination changes.

In order to solve the problem of accuracy of the moving target detection in the scenario with complicated illumination changes, the embodiment of the present document provides a mixed space-time background model based on a Space Time-Center Symmetric Local Binary Pattern (ST-CSLBP) and a modeling method thereof, and by using the mixed space-time background model to perform moving target detection on the image, moving objects can be accurately segmented in both a scenario with long-term illumination changes and a scenario with short-term illumination changes.

Figure 1:
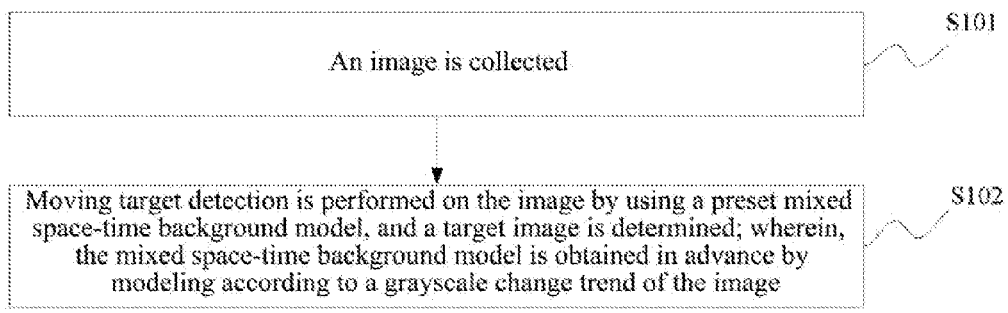
FIG. 1 is a flow diagram of a method for detecting images provided by the embodiment of the present document.

With reference to FIG. 1, a method for detecting images provided by the embodiment of the present document includes the following steps.

In step S101, an image is collected.

In step S102, moving target detection is performed on the image by using a preset mixed space-time background model, and a target image is determined.

Wherein, the mixed space-time background model is obtained in advance by modeling according to a grayscale change trend of the image.

Figure 2:
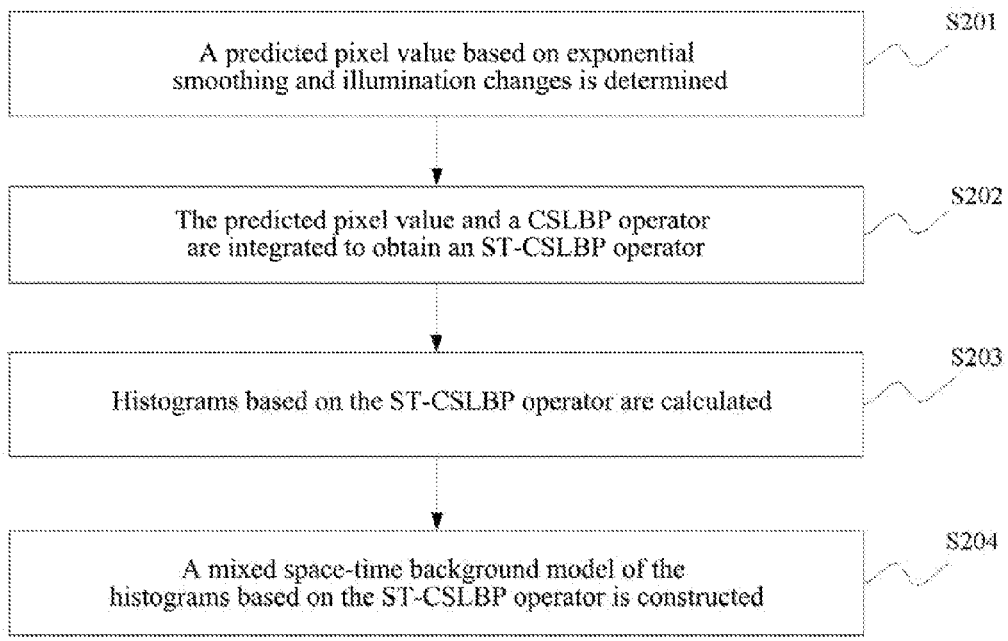
FIG. 2 is a flow diagram of a method for modeling a mixed space-time background model provided by the embodiment of the present document.

Preferably, with reference to FIG. 2, a step of presetting the mixed space-time background model provided by the embodiment of the present document includes the following steps.

In step S201, a predicted pixel value based on exponential smoothing and illumination changes is determined.

In step S202, the predicted pixel value and a CSLBP operator are integrated to obtain an ST-CSLBP operator.

In step S203, histograms corresponding to all pixels based on the ST-CSLBP operator are calculated.

In step S204, a mixed space-time background model of the histograms corresponding to all the pixels based on the ST-CSLBP operator is constructed.

Preferably, the predicted pixel value is determined by using the following formula:

$$z_t = m_t + \frac{1-\beta}{\beta} r_{t-1}$$

$$r_t = \beta(x_t - x_{t-1}) + (1-\beta)r_{t-1}$$

$$m_t = \beta x_t + (1-\beta)m_{t-1}$$

wherein, $z_t$ represents a predicted pixel value of a pixel at time t, $m_t$ represents an estimated state value of the pixel at time t, $\beta$ represents a smoothing factor, $r_{t-1}$ represents a grayscale change trend of a pixel at time t−1, $r_t$ represents a grayscale change trend of the pixel at time t, $x_t$ represents an observed pixel value of the pixel at time t, and $x_{t-1}$ represents an observed pixel value of the pixel at time t−1.

Preferably, the predicted pixel value and the CSLBP operator are integrated to obtain the ST-CSLBP operator by using the following formula:

$$ST-CSLBP_{P,R} = \sum_{p=0}^{P/2-1} \{s(g_p, g_{p+P/2})2^p + s(g_{zp}, g_{z(p+P/2)})2^{p+P/2-1}\}$$

$$s(g_i, g_j) = \begin{cases} 0 & abs(g_j - g_i) \leq T \\ 1 & Others \end{cases}$$

wherein, $ST\text{-}CSLBP_{P,R}$ represents the ST-CSLBP operator, R represents a radius of a circular region taking the current pixel as the center, P represents the number of pixels with equal intervals within the circular region, g represents a grayscale value of the pixel, $s(g_p, g_{p+P/2})2^P$ represents a grayscale similarity between a pixel p+P/2 and a pixel p, and $s(g_{zp}, g_{z(p)+P/2})2^{p+P/2-1}$ represents a grayscale similarity between a predicted pixel value of the pixel p+P/2 and a predicted pixel value of the pixel p;

$s(g_i, g_j)$ represents a grayscale similarity between a pixel i and a pixel j, $abs(g_j - g_i)$ represents an absolute value of the difference between a grayscale $g_j$ of the pixel j and a grayscale $g_i$ of the pixel i, and T represents a preset threshold.

Preferably, constructing the mixed space-time background model of the histograms corresponding to all the pixels based on the ST-CSLBP operator includes:

determining similarities between histograms corresponding to all the pixels based on the ST-CSLBP operator; and according to the similarities, judging whether the histograms corresponding to all the pixels based on the ST-CSLBP operator and histograms in the background model are matched, if yes, taking the pixels as background pixels, and if not, taking the pixels as prospect pixels.

In a mixed space-time background modeling method based on the ST-CSLBP provided by the embodiment of the present document, a brand-new ST-CSLBP operator is designed, so as to integrate time prediction and spatial domain texture information simultaneously; then histograms based on the ST-CSLBP are constructed, and a mixed space-time background model based on the ST-CSLBP histograms is obtained, so as to integrate respective advantages of the time domain distribution statistics and the spatial domain background. It specifically includes:

establishing a pixel value prediction based on exponential smoothing and illumination changes, giving a distribution trend of pixel luminance values in the time domain, and while considering the spatial domain texture information of the pixels, integrating time domain distribution characteristics of the textures, and designing a texture description operator ST-CSLBP containing spatial domain information and time domain information, which can adapt well to the short-term illumination changes including a situation that only part of pixels are changed within the region, and have a good anti-noise capability of the CSLBP in the meantime.

The ST-CSLBP operator obtained above is taken as input data, histogram distribution based on the ST-CSLBP is calculated, a statistical similarity degree between different histograms is measured through Kunback-Leible (KL) divergence, whether the different histograms are matched is determined through a preset threshold, and the mixed space-time background model based on the ST-CSLBP histograms is constructed, which integrates respective advantages of the time domain distribution statistics and the spatial domain background, so as to adapt to both the long-term illumination changes and the short-term illumination changes.

The steps of modeling the above mixed space-time background model will be illustrated respectively below.

In step S201, considering that the illumination changes scale up gradually, a proportion change trend component should be considered when forecasting and updating, and a predicted pixel value of the current image is obtained in combination with exponential forecasting.

With regard to all the pixels of each sample image, the following operations are executed. The exponential forecasting is used for performing smoothing or forecasting on time sequence data, and the most basic form is as shown in formula (1):

$$m_t = \beta x_t (1-\beta) m_{t-1} \qquad (1)$$

wherein, $m_t$ represents an estimated state value (which can be viewed as an intermediate variable) of the current pixel of an image at time t (i.e., the current sample image), $m_{t-1}$ represents an estimated state value of the pixel of an image at time t−1 (i.e., the previous sample image), $x_t$ represents an observed pixel value of the pixel of the image at time t, $\beta$ represents a smoothing factor, whose value can be 0.1 or 0.2 or so on, the lager the value of $\beta$ is, the larger a correlation between $m_t$ and $x_t$ is, and the smaller the value of $\beta$ is, the larger a correlation between $m_t$ and $m_{t-1}$ is.

The formula (1) is only applied to time sequence image data without change trends. Considering that the illumination changes scale up gradually, if a trend of the illumination changing pro rata is considered when forecasting and updating, the calculation of the predicted pixel value is as shown in formula (2):

$$z_t = m_t + \frac{1-\beta}{\beta} r_{t-1} \qquad (2)$$

$$r_t = \beta(x_t - x_{t-1}) + (1-\beta) r_{t-1}$$

wherein, $z_t$ represents a predicted pixel value of the current pixel of an image at time t, $r_t$ represents a grayscale change trend of the pixel, $r_{t-1}$ represents a grayscale change trend of the pixel of an image at time t−1, and $x_{t-1}$ represents an observed pixel value of the pixel of the image at time t−1.

In step S202, the predicted pixel value obtained in step S201 and the CSLBP operator are integrated to obtain the ST-CSLBP operator in the embodiment of the present document, and the ST-CSLBP operator contains time domain information and spatial domain information of any pixel, which can adapt to the short-term illumination changes including the situation that only part of pixels are changed within the region well, and have a good anti-noise capability of the CSLBP in the meantime. The ST-CSLBP operator is shown as follows:

$$ST - CSLBP_{P,R} = \sum_{p=0}^{P/2-1} \{s(g_p, g_{p+P/2})2^p + s(g_{zp}, g_{z(p+P/2)})2^{p+P/2-1}\} \qquad (3)$$

$$s(g_i, g_j) = \begin{cases} 0 & \text{abs}(g_j - g_i) \leq T \\ 1 & \text{Others} \end{cases} \qquad (4)$$

wherein, $ST\text{-}CSLBP_{P,R}$ represents the ST-CSLBP operator given in the embodiment of the present document, R represents a radius of a circular region taking the current pixel as the center, P represents the number of pixels with equal intervals within the circular region, g represents a grayscale value of the pixel, $s(g_p, g_{p+P/2})2^p$ represents a grayscale similarity between a pixel p+P/2 and a pixel p, which is obtained by multiplying $s(g_p, g_{p-P/2})$ by $2^p$; and $s(g_{zp}, g_{z(p)+P/2})2^{p+P/2-1}$ represents a grayscale similarity between a predicted pixel value of the pixel p+P/2 and a predicted pixel value of the pixel p, which is obtained by multiplying $s(g_{zp}, g_{z(p)+P/2})$ by $2^{p+P/2-1}$.

$s(g_i, g_j)$ represents a result obtained by comparing a grayscale value of the pixel i and a grayscale value of the pixel j, namely a grayscale similarity between the pixel i and the pixel j, each of i and j represents a serial number of the selected pixel, $\text{abs}(g_j - g_i)$ represents an absolute value of the difference between the $g_j$ and the $g_i$, and T represents a preset threshold which can generally take a value of 4 or 5.

That is, $s(g_p, g_{p+P/2})$ represents a result obtained by comparing a grayscale value of the pixel p and a grayscale value of the pixel p+P/2, p=0, 1, 2, 3 . . . , P/2, as shown in FIG. 2, when P=8, p=0, 1, 2, 3, and according to the formula (4), there is:

$$s(g_p, g_{p+P/2}) = \begin{cases} 0 & \text{abs}(g_{p+P/2} - g_p) \leq T \\ 1 & \text{Others} \end{cases}$$

wherein, $s(g_{zp}, g_{z(p)+P/2})$ represents a similarity between a grayscale $g_{zp}$ of the predicted pixel value zp of the pixel p and a grayscale $g_{z(p)+P/2}$ of the predicted pixel value z(p)+P/2 of the pixel p+P/2, and $$s(g_{zp}, g_{z(p+P/2)}) = \begin{cases} 0 & \text{abs}(g_{z(p+P/2)} - g_{zp}) \leq T \\ 1 & \text{Others} \end{cases}.$$

$ST\text{-}CSLBP_{P,R}$ in the formula (3) is the ST-CSLBP operator designed in the embodiment of the present document, P and R are the preset parameter values, indicating P pixels with equal intervals within a circular neighborhood with a radius R and taking the current pixel as the center, for example, when R=3, that is, when the radius is of 3 pixels, P is equal to 8 (i.e., including 8 pixels).

Grayscale values of points (i.e., equal diversion points obtained by equally dividing a circle with the radius R via P) which do not completely fall in locations of the pixels are calculated through a bilinear interpolation algorithm.

zp (p=0, 1, . . . , P−1) is the predicted pixel value, and as shown in the formula (2), and it is obtained through forecasting according to a historical pixel value sequence of the location. As shown in formula (4), s(gi, gj) represents a grayscale value relationship between the pixel i and the pixel j, and it is obtained by performing binarization processing on location-related pixels on the circumference, i and j satisfy j=i+P/2.

In the ST-CSLBP operator, the $s(g_p, g_{p+P/2})$ item maintains the advantage that the CSLBP has a robustness and strong anti-noise capability with respect to the short-term illuminations, and the time domain information introduced by the $s(g_{zp}, g_{z(p)+P/2})$ item makes the operator possess a robustness with respect to the long-term illumination changes in the meantime.

FIG. 3 is a descriptive diagram of the ST-CSLBP operator when R=3 and P=8, it can be seen that, since the ST-CSLBP operator contains the time domain information and the spatial domain information simultaneously, it can well adapt to the short-term illumination changes and the long-term illumination changes including the situation that only part of pixels are changed within the image region contained by the operator, and it can have a good anti-noise capacity of the CSLBP in the meantime.

In step S203, the ST-CSLBP operator obtained in the step S202 is taken as the input data, and the histograms based on the ST-CSLBP are constructed to obtain an object of the background modeling.

With regard to each pixel in the image, N represents an n*n rectangular region taking the pixel as the center, and a histogram Ht at time t is calculated as shown in formula (5):

$$H_{t,i}(g_c) = \sum_{(x,y) \in N} I(X) \qquad (5)$$

$$I(X) = \begin{cases} 1, & \text{if } ST - CSLBP_{P,R}(g_c) = i \\ 0, & \text{others} \end{cases}$$

wherein, Ht,i is the $i^{th}$ histogram abscissa (bin) in the histogram Ht, and i=0, 1, . . . , 2P−1.

$g_c$ represents a grayscale value at a pixel c, i represents a numerical variable, if i is equal to ST-CSLBP$_{P,R}$(g$_c$), I(X) is 1, and if i is not equal to ST-CSLBP$_{P,R}$(g$_c$), I(X) is 0, x,y represent pixel coordinates respectively, and I(X) is an intermediate variable and it is used for calculating a value of $H_{t,i}$(g$_c$).

In step S204, the statistical similarity degree between different histograms (i.e. the histograms corresponding to all the pixels) is measured through the Kunback-Leible divergence, whether every two histograms are matched is determined through the preset threshold, and the mixed space-time background model based on the ST-CSLBP histogram is constructed, and online updating is performed on the mixed space-time background model through the following step 3 and operations after the step 3, which integrates respective advantages of the time domain distribution statistics and the spatial domain background, so as to adapt to both the long-term illumination changes and the short-term illumination changes.

Each pixel in the image is modeled by the current background model (mt, 0, . . . , mt, k–1) of K weighted histograms (a value of K is generally from 3 to 5), wherein, each modality in the background model is the histogram as shown in formula (5), the K histograms can be obtained through the following step 3 and operations after the step 3, and modeling can be performed by using the K histograms.

The step of updating a single pixel of the background model includes the following steps.

In step 1, with respect to each pixel, a new histogram Ht obtained from the current image is compared with the existing K histograms by using formula (6), and similarities between the new histogram Ht and the existing K histograms are calculated through the Kunback-Leible divergence. With the Kunback-Leible divergence, the statistical similarity degree between two histograms is measured by using a standard similar to distance, compared with the similarity degree measurement based on distributed samples, the similarity degree measurement based on statistics can more realistically reflect a constitutive relation between attributes of the two histograms, the shorter the "distance" is, the larger the similarity degree is, when the "distance" is short enough, it is believed that the two histograms are matched, TH is used as the threshold to judge whether the two histograms are matched, and a similarity degree between a histogram A and a histogram B is defined as:

$$\kappa(A, B) = \sum_{i=1}^{d} (A(i) \quad B(i)) \ln \frac{A(i)}{B(i)} \quad (6)$$

κ(A,B) represents the similarity degree between the histogram A and the histogram B, A(i) represents a value of the i$^{th}$ bin in the histogram A, B(i) represents a value of the i$^{th}$ bin in the histogram B, and d represents a value range of the histogram abscissa.

In step 2, if a new histogram of a pixel and a histogram in a certain background model are matched, and the matched background model satisfies formula (10) in step 7 in the meantime, the pixel is a background pixel, and if the new histogram of the pixel and a histogram in a certain background model are not matched, or the matched background model satisfies the formula (10) in step 7, the pixel is a prospect pixel.

In step 3, a formula for updating a weight $\omega_{k,t}$ at time t of the k$^{th}$ histogram in the background model at the current time t is as follows:

$$\omega_{k,t} = (1-\alpha_\omega)\omega_{k,t-1} + \alpha_\omega M_{k,t} \quad (7)$$

wherein, $\alpha_\omega$ represents a custom learning rate and its value can be 0.05, $\omega_{k,t-1}$ represents a weight at time t–1, when the new histogram of the pixel and a histogram in a certain background model are matched, $M_{k,t}$ is 1, and if the new histogram of the pixel and a histogram in a certain background model are not matched, $M_{k,t}$ is 0.

After updating, the weight needs to be normalized again to make a sum of weights of all modalities be 1.

In step 4, if a certain histogram mi in the background model and the new histogram are matched, a histogram in the background model matched with the current histogram is updated as shown in formula (8):

$$m_{i,t} = (1-\alpha_b)m_{i,t-1} + \alpha_b H_t \quad (8)$$

wherein, $m_{i,t}$ represents the i$^{th}$ histogram in a background model at time t, $\alpha_b$ represents an updating coefficient and it is generally 0.05, $m_{i,t-1}$ represents the i$^{th}$ histogram in a background model at time t–1, and $H_t$ represents the histogram of the current image at time t.

In step 5, if no background histograms are matched, a new background histogram mk,t is added and an initial value of its weight is ω0, and then the weight is normalized by using formula (9):

$$m_{k+1,t} = H_t, \omega_{k+1,t} \omega_0 \quad (9)$$

wherein, $m_{k+1,t}$ represents the k+1$^{th}$ histogram in the background model at time t, and $\omega_{k+1,t}$ represents the weight at time t of the k+1$^{th}$ histogram in the background model.

In step 6, when there are more than K models (i.e., K histograms), a histogram with the smallest weight is deleted, and then each weigh is normalized to make a sum of all the weights be 1.

In step 7, all the background histograms are sequenced in a descending sort with respect to the weight values, the first least b histograms satisfying the formula (10) are selected from K histograms sequenced in the descending sort to represent the background (b<K), wherein TB is a self-defined threshold, for example, it can take a value of 0.7:

$$B_H = \underset{b}{\operatorname{argmin}}\left(\sum_{k=1}^{b} \omega_{k,t} > T_B\right) \quad (10)$$

wherein, $\omega_{k,t}$ represents the weight at time t of the k$^{th}$ histogram in the background model, the weights of all the histograms of the pixels are sequenced, the least b histograms are selected to make the sum of the weights greater than the threshold, and the selected b histograms distribution construct a multi-modal background $B_H$.

In order to facilitate the performance evaluation and comparison between the method of the embodiment of the present document and other methods, an evaluation index based on accuracy rate and detection rate is introduced as shown in formula (11) respectively:

$$\text{Accuracy rate } (\%) = \frac{TP}{TP + FP} \times 100 \quad (11)$$

$$\text{Recall Rate (\%)} = \frac{TP}{TP+FN} \times 100$$

wherein TP, TN, FP and FN are as shown in Table 1:

TABLE 1

| Detection situation of each pixel | |
|---|---|
| TP | Truly detected prospect |
| TN | Truly detected background |
| FP | Falsely detected prospect |
| FN | Falsely detected background |

With the mixed space-time background modeling method provided in the embodiment of the present document, the parameters are selected: β=0.9, N=3*3, R=2, and P=4, a PETS2001 standard video (whose resolution ratio is reduced to 320*240) is detected, and the detection result of one frame therein is as shown from FIG. 4-a to FIG. 4-d, wherein, FIG. 4-a is an input image of the current frame, FIG. 4-b is a detection result of a Gaussian mixture model based on color, FIG. 4-c is a detection result based on a space model, and FIG. 4-d is a detection result obtained through the mixed space-time background modeling method provided by the embodiment of the present document.

The truly detected prospect point (TP), the truly detected background point (TN), the pixels falsely detected as prospect (FP) and the pixels falsely detected as background (FN) can be seen from FIG. 4-a to FIG. 4-d. As can be seen from FIG. 4-b, with the method based on the mixed Gaussian, not only the prospect objects are detected, but also part of background points with the short-term illumination changes are falsely detected as prospect pixels; as can be seen from FIG. 4-c, with the method based on the texture model, it can better adapt to the short-term illumination changes, but a histogram modeling way is used, thus the pixels close to the prospect objects tend to be falsely detected, and after integrating the time information and the space information in the embodiment of the present document, FIG. 4-b is obtained, and a comparatively ideal result is obtained.

Parameters R and N are adjusted, the detection results and standard binarization detection results are compared, the accuracy rate and detection rate detected are obtained according to the formula (9) as shown in the following Table 2:

TABLE 2

| Comparison between detection results under different parameters | | | | |
|---|---|---|---|---|
| R | 2 | 2 | 3 | 3 |
| N | 3 × 3 | 5 × 5 | 3 × 3 | 5 × 5 |
| Accuracy rate (%) | 84.5 | 86.4 | 84.6 | 86.2 |
| Detection rate (%) | 72.3 | 63.7 | 71.1 | 62.1 |

At present, the common background modeling methods are as follows:

Gaussian mixture model;
self-adaptive Gaussian mixture model;
spatial domain model based on a Radial Reach filter (RRF); and
spatial domain model based on the LBP.

After detecting the PETS2001 standard video, a performance comparison with respect to the above existing background modeling methods and the mixed space-time background model provided by the embodiment of the present document (when a value of N is 3×3 and R=2) is as shown in FIG. 5, as seen from FIG. 5, compared with the existing methods, the mixed space-time background model provided by the embodiment of the present document can adapt to various situations of illumination changes in the complicated scenarios, and a higher detection accuracy rate and detection rate are acquired.

With the mixed space-time background model provided by the embodiment of the present document, part of test results of a standard sequence are as shown from FIG. 6-a to FIG. 6-f, wherein, FIG. 6-a to FIG. 6-d are input images of the current frame, FIG. 6-b to FIG. 6-e are detection results obtained through the mixed space-time background model provided by the embodiment of the present document, and FIG. 6-c to FIG. 6-f are standard test results (i.e., Ground Truth) of the sequence.

With reference to FIG. 7, a device for detecting images provided by the embodiment of the present document includes:

an image acquisition unit 11, configured to: acquire an image; and a moving target detection unit 12, configured to: perform moving target detection on the image by using a preset mixed space-time background model, and determine a target image; wherein, the mixed space-time background model is obtained in advance by modeling according to a grayscale change trend of the image.

Preferably, the moving target detection unit 12 includes:

a mixed space-time background model unit 121, configured to: determine a predicted pixel value based on exponential smoothing and illumination changes; integrate the predicted pixel value and a CSLBP operator to obtain an ST-CSLBP operator; calculate histograms corresponding to all pixels based on the ST-CSLBP operator; and construct the mixed space-time background model of the histograms corresponding to all the pixels based on the ST-CSLBP operator; and a detection unit 122, configured to: perform moving target detection on the image by using the mixed space-time background model, and determine the target image.

Preferably, the mixed space-time background model unit 121 determines the predicted pixel value by using the following formula:

$$z_t = m_t + \frac{1-\beta}{\beta}r_{t-1}$$

$$r_t = \beta(x_t - x_{t-1}) + (1-\beta)r_{t-1}$$

$$m_t = \beta x_t + (1-\beta)m_{t-1};$$

wherein, $z_t$ represents a predicted pixel value of a pixel at time t, $m_t$ represents an estimated state value of the pixel at time t, β represents a smoothing factor, $r_{t-1}$ represents a grayscale change trend of the pixel at time t−1, $r_t$ represents a grayscale change trend of the pixel at time t, $x_t$ represents an observed pixel value of the pixel at time t, and $x_{t-1}$ represents an observed pixel value of the pixel at time t−1.

Preferably, the mixed space-time background model unit 121 integrates the predicted pixel value and the CSLBP operator to obtain the ST-CSLBP operator by using the following formula:

$$ST - CSLBP_{P,R} = \sum_{p=0}^{P/2-1} \{s(g_p, g_{p+P/2})2^p + s(g_{zp}, g_{z(p+P/2)})2^{p+P/2-1}\}$$

$$s(g_i, g_j) = \begin{cases} 0 & \text{abs}(g_j - g_i) \leq T \\ 1 & \text{Others} \end{cases} ;$$

wherein, $ST\text{-}CSLBP_{P,R}$ represents the ST-CSLBP operator, R represents a radius of a circular region taking the current pixel as the center, P represents the number of pixels with equal intervals within the circular region, g represents a grayscale value of the pixel, $s(g_p, g_{p+P/2})2^p$ represents a grayscale similarity between a pixel p+P/2 and a pixel p, and $s(g_{zp}, g_{z(p)+P/2})2^{p+P/2-1}$ represents a grayscale similarity between a predicted pixel value of the pixel p+P/2 and a predicted pixel value of the pixel p;

$s(g_i, g_j)$ represents a grayscale similarity between a pixel i and a pixel j, $\text{abs}(g_j - g_i)$ represents an absolute value of the difference between a grayscale $g_j$ of the pixel j and a grayscale $g_i$ of the pixel i, and T represents a preset threshold.

Preferably, the mixed space-time background model unit 121 determines similarities between the histograms corresponding to all the pixels based on the ST-CSLBP operator; and according to the similarities, judges whether the histograms corresponding to all the pixels based on the ST-CSLBP operator and histograms in the background model are matched, if yes, the pixels are taken as background pixels, and if not, the pixels are taken as prospect pixels.

In conclusion, based on the in-depth study of background modeling technology, the embodiment of the present document provides the mixed space-time background modeling method based on the ST-CSLB, which fully uses the time domain information and the spatial domain information and designs an integration rule of the mixed method, thereby enabling the mixed space-time background model to adapt to both the long-term illumination changes and the short-term illumination changes. It can be seen from the test results that, by performing moving target detection on the image through the mixed space-time background model provided by the embodiment of the present document, the situations of illumination changes in the complicated scenarios can be adapted better and a higher detection accuracy rate and detection rate are obtained.

The skilled in the art should understand that, the embodiment of the present document can be provided as a method, a system or computer program products. Therefore, the present document can be in a form of complete hardware embodiments, complete software embodiments or embodiments combining software and hardware. Moreover, the present document can be in a form of computer program products executed on one or multiple computer available memory mediums (including but not limited to magnetic disk memory and optical memory) in which computer available program codes are contained.

The present document is described with reference to the flow diagrams and/or block diagrams according to the method, device (system) and computer program products of the embodiment of the present document. It should be understood that each flow and/or block in the flow diagrams and/or block diagrams and the combination of flow and/or block in the flow diagrams and/or block diagrams can be implemented through computer program commands. These computer program commands can be provided to general-purpose computer, special-purpose computer, embedded processor or processors of other programmable data processing devices to produce a machine, so as to produce a device used for implementing specified functions in one or more flows in the flow diagrams and/or one or more blocks in the block diagrams through the commands executed by the computers or the processors of other programmable data processing devices.

These computer program commands also can be stored in a computer readable memory which can guide the computers or other programmable data processing devices to work in a particular way, so as to make the commands stored in the computer readable memory produce manufactures including a command device, and the command device implements the specified functions in one or more flows in the flow diagrams and/or one or more blocks in the block diagrams.

These computer program commands also can be loaded on the computers or other programmable data processing devices, so as to execute a series of operation steps on the computers or other programmable devices to produce processing implemented by the computers, thus the command executed on the computers or other programmable devices provide the steps used for implementing the specified functions in one or more flows in the flow diagrams and/or one or more blocks in the block diagrams.

Apparently, those skilled in the art can make various modifications and variations for the present document without departing from the spirit and scope of the present document. Therefore, if these modifications and variations of the present document belong to the scope of the claims of the present document and the equivalent techniques thereof, the present document also intends to include these modifications and variations.

INDUSTRIAL APPLICABILITY

In the embodiment of the present document, the mixed space-time background model is obtained by modeling according to the grayscale change trend of the image; the image is collected, the moving target detection is performed on the image by using the mixed space-time background model, and the target image is determined, thus the detection rate and accuracy rate of the image moving target detection are improved, so that moving targets in the image also can be accurately detected in a scenario with complicated illumination changes.

What is claimed is:

1. A method for detecting images, comprising:
   modeling to obtain a mixed space-time background model according to a grayscale change trend of an image; and
   collecting the image, performing moving target detection on the image by using the mixed space-time background model to determine a moving target image;
   wherein said modeling to obtain a mixed space-time background model according to a grayscale change trend of an image comprises:
   determining a predicted pixel value based on exponential smoothing and illumination changes;
   integrating the predicted pixel value and a Center Symmetric Local Binary Pattern (CSLBP) operator to obtain a Space Time-Center Symmetric-Local Binary Pattern (ST-CSLBP) operator;
   calculating histograms corresponding to all pixels based on the ST-CSLBP operator; and
   constructing a mixed space-time background model of the histograms corresponding to all the pixels based on the ST-CSLBP operator;
   wherein the predicted pixel value is determined by using the following formula:

$$z_t = m_t + \frac{1-\beta}{\beta} r_{t-1}$$
$$r_t = \beta(x_t - x_{t-1}) + (1-\beta)r_{t-1}$$
$$m_t = \beta x_t + (1-\beta)m_{t-1};$$

wherein $z_t$ represents a predicted pixel value of a pixel at time t, $m_t$ represents an estimated state value of the pixel at time t, $\beta$ represents a smoothing factor, $r_{t-1}$ represents a grayscale change trend of the pixel at time t−1, $r_t$ represents a grayscale change trend of the pixel at time t, $x_t$ represents an observed pixel value of the pixel at time t, and $x_{t-1}$ represents an observed pixel value of the pixel at time t−1.

2. The method according to claim 1, wherein the predicted pixel value and the CSLBP operator are integrated to obtain the ST-CSLBP operator by using the following formula:

$$ST\text{-}CSLBP_{P,R} = \sum_{p=0}^{P/2-1} \{s(g_p, g_{p+P/2})2^p + s(g_{zp}, g_{z(p+P/2)})2^{p+P/2-1}\}$$

$$s(g_i, g_j) = \begin{cases} 0 & \text{abs}(g_j - g_i) \leq T \\ 1 & \text{Others} \end{cases};$$

wherein $ST\text{-}CSLBP_{P,R}$ represents the ST-CSLBP operator, R represents a radius of a circular region taking the current pixel as a center, P represents a number of pixels with equal intervals within the circular region, g represents a grayscale value of the pixel, $s(g_p, g_{z(p)+P/2})2^p$ represents a grayscale similarity between a pixel p+P/2 and a pixel p, and $s(g_{zp}, g_{z(p)+P/2})2^{p+P/2-1}$ represents a grayscale similarity between a predicted pixel value of the pixel p+P/2 and a predicted pixel value of the pixel p; $s(g_i, g_j)$ represents a grayscale similarity between a pixel i and a pixel j, $\text{abs}(g_j - g_i)$ represents an absolute value of a difference between a grayscale $g_j$ of the pixel j and a grayscale $g_i$ of the pixel i, and T represents a preset threshold.

3. The method according to claim 1, wherein said constructing a mixed space-time background model of the histograms corresponding to all the pixels based on the ST-CSLBP operator comprises:
determining similarities between histograms corresponding to all the pixels based on the ST-CSLBP operator; and
according to the similarities, judging whether the histograms corresponding to all the pixels based on the ST-CSLBP operator and histograms in the background model are matched, if yes, taking the pixels as background pixels, and if not, taking the pixels as prospect pixels.

4. A device for detecting images, comprising a processor, and a storage device for storing computer executable instructions that when executed by the processor cause the processor to perform the steps in the following modules:
an image acquisition unit, configured to: acquire an image; and
a moving target detection unit, configured to: perform moving target detection on the image by using a preset mixed space-time background model to determine a moving target image; wherein the mixed space-time background model is obtained in advance by modeling according to a grayscale change trend of the image;
wherein the moving target detection unit comprises:
a mixed space-time background model unit, configured to: determine a predicted pixel value based on exponential smoothing and illumination changes; integrate the predicted pixel value and a Center Symmetric Local Binary Pattern (CSLBP) operator to obtain a Space Time-Center Symmetric-Local Binary Pattern (ST-CSLBP) operator; calculate histograms corresponding to all pixels based on the ST-CSLBP operator; and construct the mixed space-time background model of the histograms corresponding to all the pixels based on the ST-CSLBP operator;
wherein the mixed space-time background model unit is configured to determine the predicted pixel value by using the following formula:

$$z_t = m_t + \frac{1-\beta}{\beta} r_{t-1}$$
$$r_t = \beta(x_t - x_{t-1}) + (1-\beta)r_{t-1}$$
$$m_t = \beta x_t + (1-\beta)m_{t-1};$$

wherein $z_t$ represents a predicted pixel value of a pixel at time t, $m_t$ represents an estimated state value of the pixel at time t, $\beta$ represents a smoothing factor, $r_{t-1}$ represents a grayscale change trend of the pixel at time t−1, $r_t$ represents a grayscale change trend of the pixel at time t, $x_t$ represents an observed pixel value of the pixel at time t, and $x_{t-1}$ represents an observed pixel value of the pixel at time t−1.

5. The device according to claim 4, wherein the mixed space-time background model unit is configured to integrate the predicted pixel value and the CSLBP operator to obtain the ST-CSLBP operator by using the following formula:

$$ST\text{-}CSLBP_{P,R} = \sum_{p=0}^{P/2-1} \{s(g_p, g_{p+P/2})2^p + s(g_{zp}, g_{z(p+P/2)})2^{p+P/2-1}\}$$

$$s(g_i, g_j) = \begin{cases} 0 & \text{abs}(g_j - g_i) \leq T \\ 1 & \text{Others} \end{cases};$$

wherein $ST\text{-}CSLBP_{P,R}$ represents the ST-CSLBP operator, R represents a radius of a circular region taking the current pixel as a center, P represents a number of pixels with equal intervals within the circular region, g represents a grayscale value of the pixel, $s(g_p, g_{p+P/2})2^p$ represents a grayscale similarity between a pixel p+P/2 and a pixel p, and $s(g_{zp}, g_{z(p)+P/2})2^{p+P/2-1}$ represents a grayscale similarity between a predicted pixel value of the pixel p+P/2 and a predicted pixel value of the pixel p; $s(g_i, g_j)$ represents a grayscale similarity between a pixel i and a pixel j, $\text{abs}(g_j - g_i)$ represents an absolute value of a difference between a grayscale $g_j$ of the pixel j and a grayscale $g_i$ of the pixel i, and T represents a preset threshold.

6. The device according to claim 4, wherein the mixed space-time background model unit is configured to construct the mixed space-time background model of the histograms corresponding to all the pixels based on the ST-CSLBP operator by means of: determining similarities between the histograms corresponding to all the pixels based on the ST-CSLBP operator; according to the similarities, judging whether the histograms corresponding to all the pixels based on the ST- CSLBP operator and histograms in the background model are matched, if yes, taking the pixels as background pixels, and if not, taking the pixels as prospect pixels.

* * * * *